United States Patent
Lehner

(10) Patent No.: US 7,552,012 B2
(45) Date of Patent: Jun. 23, 2009

(54) DEVICE FOR DETECTING OBJECTS IN THE BLIND SPOT OF A VEHICLE

(75) Inventor: Philipp Lehner, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 432 days.

(21) Appl. No.: 11/432,966

(22) Filed: May 12, 2006

(65) Prior Publication Data
US 2006/0287828 A1      Dec. 21, 2006

(30) Foreign Application Priority Data
Jun. 15, 2005    (DE)    ................ 10 2005 027 653

(51) Int. Cl.
*G08G 1/16*   (2006.01)
*F41G 9/00*   (2006.01)

(52) U.S. Cl. ................ 701/301; 701/302; 701/36; 701/45; 356/4.01; 356/5.01; 340/933; 340/435; 340/436; 340/438

(58) Field of Classification Search ................ 701/301, 701/36, 45, 300; 340/933, 435, 436, 438; 356/27, 4.01, 5.01–5.08
See application file for complete search history.

(56) References Cited

U.S. PATENT DOCUMENTS

| | | | |
|---|---|---|---|
| 6,363,326 B1 * | 3/2002 | Scully | 701/301 |
| 6,674,934 B2 * | 1/2004 | Carey et al. | 385/16 |
| 6,727,844 B1 * | 4/2004 | Zimmermann et al. | 342/70 |
| 7,046,128 B2 * | 5/2006 | Roberts | 340/436 |
| 7,161,472 B2 * | 1/2007 | Strumolo et al. | 340/436 |
| 7,190,281 B2 * | 3/2007 | Nagasawa et al. | 340/903 |
| 2003/0218564 A1 * | 11/2003 | Tamatsu et al. | 342/70 |

FOREIGN PATENT DOCUMENTS

DE      101 25 426      11/2002

* cited by examiner

*Primary Examiner*—Khoi Tran
*Assistant Examiner*—Bhavesh V Amin
(74) *Attorney, Agent, or Firm*—Kenyon & Kenyon LLP

(57) ABSTRACT

A device for detecting objects in the blind spot on a side of vehicle includes a ranging main sensor, an auxiliary sensor, a comparison unit, and an output unit for outputting a warning signal which indicates objects in the blind spot. The detection range of the main sensor extends in the rear area of the vehicle and toward the respective vehicle side. The auxiliary sensor has a detection range which extends angularly offset to the detection range of the main sensor in the rear area of the vehicle. The comparison unit ascertains whether the detected object is a following vehicle on the basis of predefined correlations between the detection signals of the main sensor and the auxiliary sensor, and the detection unit blocks the output unit from outputting a warning signal when a following vehicle is recognized.

20 Claims, 2 Drawing Sheets

DEVICE FOR DETECTING OBJECTS IN THE BLIND SPOT OF A VEHICLE

FIELD OF THE INVENTION

The present invention relates to a device for detecting objects in the blind spot on a side of a vehicle, a detection range of which device extends into the rear area of the vehicle and to the respective vehicle side, and which device includes an output unit for outputting a warning signal which indicates objects in the blind spot.

BACKGROUND INFORMATION

A frequent cause of accidents in street traffic is that the driver overlooks another vehicle located in the blind spot during a lane change or when cornering. To reduce this danger, warning systems have been developed, which are capable of detecting objects in the blind spot with the aid of a ranging sensor, identified here as the main sensor, and outputting a warning indication to the driver, for example, in the form of a visual display in the outside mirror for the affected vehicle side. If necessary, an acoustic warning signal may also be output if the intention of the driver to change lanes or corner is recognized based on the status of the turn signal and/or the steering movements.

Such warning systems are also referred to as BSD (blind spot detection) systems. In such systems, a short-range radar sensor (SRR), such as a pulse radar, a lidar sensor, or an ultrasonic sensor, is frequently used as the sensor. Typically, these sensors execute only a distance measurement and do not have any angular resolution capabilities, so that only restricted information is available about the precise position and the movement state of the detected object. Incorrect warnings may thus occur easily, which lower the driver's trust in the system.

A warning system of this type is described in published German patent document DE 101 25 426, in which system, in addition to the main sensor which is located on the vehicle side to be monitored at the rear vehicle corner, a second ranging sensor is provided on the front vehicle corner, so that through the combined detection ranges of both sensors, the entire area of the neighboring lane is monitored at the side of the host vehicle, as well as slightly in front and behind. Through an analysis of the time curve of the distance values periodically measured by the two sensors, it may then be ascertained whether the detected object is moving in the same direction as the host vehicle or in the opposite direction, or whether the detected object is a stationary object. In this way, incorrect warnings which are caused by oncoming traffic or by stationary objects such as traffic signs, guide rails, and the like, may be prevented.

Incorrect warnings may, however, also be triggered by objects which move in the same direction as the host vehicle, for example, by a following vehicle which follows the host vehicle in the same lane and approaches so closely that it reaches the detection range of the rear sensor. In order to avoid such incorrect warnings, until now the main sensor has been configured and positioned in such a way that its detection range is directed diagonally to the rear on the neighboring lane, so that following vehicles are normally not detected. However, in curves or in cases in which the following vehicle drives somewhat offset to the host vehicle, the following vehicle may still reach the detection range and thus trigger an incorrect warning.

SUMMARY OF THE INVENTION

The present invention allows the probability of incorrect warnings in detecting objects in the blind spot to be reduced without deploying angle-resolving sensors. For this purpose, the device according to the present invention is implemented in such a way that, in addition to the distance signal of the main sensor which monitors the blind spot on one side of the vehicle, it additionally analyzes the signal of a ranging auxiliary sensor, whose detection range extends angularly offset to the detection range of the main sensor into the rear area of the vehicle, so that it only detects following vehicles, but not objects which are actually located in the blind spot on the neighboring lane. If an object is detected by the main sensor, it may be recognized by analyzing the signal of the auxiliary sensor whether the detected object is a relevant object in the blind spot or merely a following vehicle which should not trigger a warning. If an object is only detected by the main sensor but not by the auxiliary sensor, it is a relevant object in the blind spot. However, if an object is also detected by the auxiliary sensor and a specific correlation exists between the distance data of the main sensor and the auxiliary sensor, for example, in that the distance data and/or its time derivatives (relative velocities) correspond within certain limits, it may be concluded that both sensors are detecting the same object and therefore this object is a following vehicle, which is not actually in the blind spot.

The sensor which is referred to here as an "auxiliary sensor" may be a sensor which is already present in the vehicle, so that the present invention may be implemented without additional or more complex sensor components having to be installed on the vehicle.

If the warning system is implemented for the purpose of monitoring the blind spot on both sides of the vehicle, the auxiliary sensor is the main sensor of the system in regard to one vehicle side, using which the other vehicle side is monitored. Therefore, to monitor the blind spot on both sides of the vehicle, two ranging sensors are still required in the rear of the vehicle, which function alternately as the main sensor and as the auxiliary sensor, depending on which vehicle side the analysis relates to. In this example embodiment, it is expedient to expand the angular detection ranges of both sensors in the direction of the longitudinal central axis of the vehicle, so that following vehicles may still be detected by both sensors even in the event of offset driving or in slight curves.

According to another example embodiment, the auxiliary sensor is a sensor or a group of sensors which belong to another sensor system of the vehicle, such as ultrasonic sensors of an electronic parking aid, for example.

If the following vehicle temporarily leaves the detection range of the auxiliary sensor, for example, when driving significantly offset or if the distance temporarily exceeds the detection depth of the ultrasonic sensors, the object, which is then still only detected by the main sensor, may also be qualified further as a following vehicle if the signal of the main sensor fulfills certain continuity and limiting conditions. These continuity and limiting conditions may be taken into consideration for the situations in which the previous following vehicle veers off to the neighboring lane and thus becomes a relevant obstruction in the blind spot or in which, in addition to the following vehicle, a neighboring lane object, such as a passing vehicle, drives into the blind spot. Both cases may be recognized in that the distance measured by the main sensor is reduced and/or falls below a specific threshold value. The threshold value may be selected in such a way that it is less than the smallest safety distance which a following vehicle would normally maintain, but is greater than the lateral distance between the main sensor and a vehicle driving in the neighboring lane.

If the sensor system of the parking aid used as an auxiliary sensor has multiple ultrasonic sensors distributed over the rear of the vehicle, different modes of operation are possible for the auxiliary sensor system. For example, it may be expedient to only activate or analyze those sensors which are directed to the rear, approximately parallel to the vehicle longitudinal axis. It is also possible that only one of the sensors transmits an ultrasonic pulse, which is then received by multiple sensors. Vice versa, it is possible for multiple ultrasonic sensors to transmit a pulse simultaneously, which is only received by one single sensor (e.g., directed to the rear). This latter variation has the advantage that a higher overall sound pressure and therefore a greater position finding depth is achieved, which partially compensates for the generally shorter range of the ultrasonic sensors in comparison to radar sensors. In the analysis of the distance signals of the ultrasonic sensors, the different installation location of these sensors in comparison to the main sensor may be taken into consideration.

DETAILED DESCRIPTION

Figure 1:
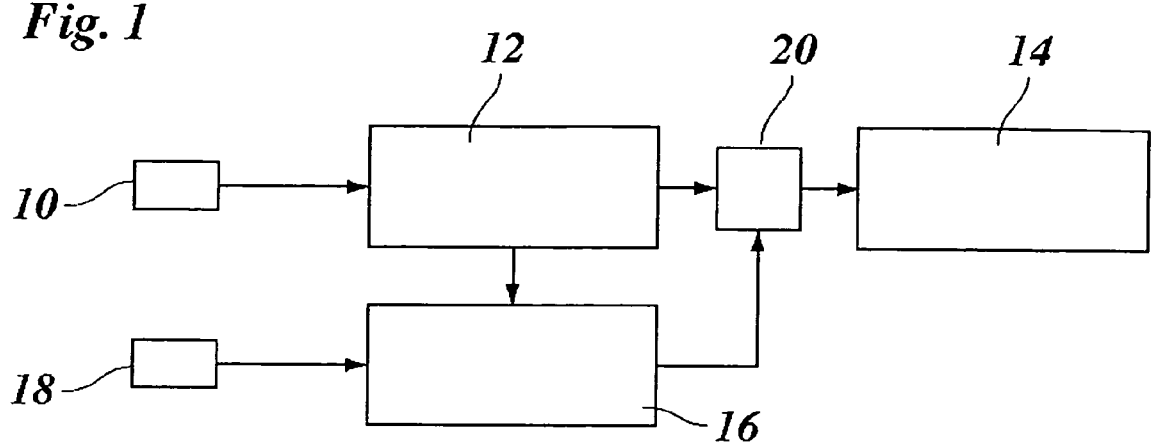
FIG. 1 shows a schematic block diagram of an example embodiment of a device according to the present invention for monitoring the blind spot on a vehicle side.

FIG. 1 shows a block diagram of an example embodiment of a device according to the present invention for monitoring the blind spot on a side of a motor vehicle, such as the left vehicle side. A ranging main sensor 10, such as an SRR pulse radar, provides distance data of the detected objects in the blind spot, e.g., in the rear area of the vehicle on the left neighboring lane, to an electronic analysis unit 12. If at least one object is detected or if, in the event main sensor 10 has a greater range, the measured object distance or, in the case of multiple objects, the smallest of these distances is below a specific threshold value, it may generally be assumed that an object is located in the blind spot, and a warning signal is then output to the driver via an output unit 14 in the form of a visual display in the left outside mirror, for example.

The distance data is also relayed by analysis unit 12 to a comparison unit 16, and compared there to distance data of ranging auxiliary sensor 18, which monitors the rear area of the vehicle, for example. If the distance data measured by the two sensors is consistent in such a way that it may be assigned to the same object, this allows the conclusion that the object is still in the detection range of main sensor 10, but is actually not in the blind spot; instead, the object is located behind the host vehicle, i.e., the object is a following vehicle which follows the host vehicle in the same driving lane at a relatively short distance. Under these circumstances, the output of the warning signal via warning unit 14 is suppressed, which is indicated in FIG. 1 in that comparison unit 16 activates a blocking element 20 inserted between analysis unit 12 and output unit 14. In practice, of course, analysis unit 12, comparison unit 16, and blocking element 20 may be implemented as software in a single electronic data processing unit. Because the output of the warning signal is suppressed when a following vehicle is recognized, incorrect warnings may be effectively avoided.

Figure 2:
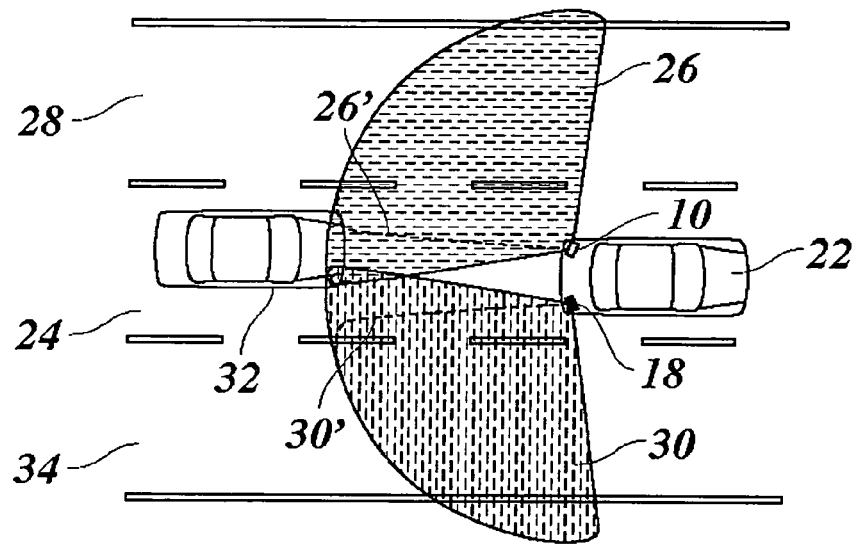
FIG. 2 is a diagram illustrating an example traffic situation in connection with the operation of the device shown in FIG. 1.

FIG. 2 shows a vehicle 22 which travels in middle lane 24 of a multi-lane roadway and is equipped with two devices of the type shown in FIG. 1, namely one for each vehicle side. Main sensor 10 for monitoring the blind spot on the left vehicle side is installed at the left rear corner in vehicle 22 and has a detection range 26 shaped approximately like a circular sector, which covers the blind spot on left neighboring lane 28 and also a part of middle lane 24, i.e., the lane of vehicle 22, in the rear area of vehicle 22. Auxiliary sensor 18 is installed at the right rear corner of vehicle 22 and simultaneously functions as the main sensor of the device for monitoring the blind spot on the right vehicle side. Detection range 30 of auxiliary sensor 18 is therefore a mirror image to detection range 26 of main sensor 10.

In FIG. 2, a following vehicle 32 travels in middle lane 24 at a short distance behind vehicle 22, but offset somewhat to the left in relation to vehicle 22. Because of the geometry of detection ranges 26 and 30 selected here, following vehicle 32 is detected by both main sensor 10 and also auxiliary sensor 18. Both sensors also measure approximately equal vehicle distances at approximately the same points in time. It may be recognized from these detected conditions that the detected object is not actually in the blind spot on the left vehicle side, but rather the object is following vehicle 32 in middle lane 24. Accordingly, the output of a warning signal is suppressed in this situation.

For comparison purposes, boundaries 26' and 30' of the detection ranges of SRR sensors are drawn as dashed lines in FIG. 2, as they would be used in conventional systems for monitoring the blind spot on both vehicle sides. These two detection ranges are concentrated more strongly on the particular neighboring lane and leave a gap between the two detection ranges in the area of the vehicle longitudinal axis, in which a following vehicle not offset to the host vehicle would be normally located, so that the sensors would be "blind" to the following vehicle. Since, however, in the example shown in FIG. 2, following vehicle 32 drives offset somewhat to the left, it would nonetheless be detected by main sensor 10 (of the conventional systems) for the left vehicle side, but the following vehicle would lie outside boundary 30' for the detection range of the conventional sensor on the right vehicle side. Since in this case only one of the two sensors would generate a signal, it may not be ascertained whether the detected object is a following vehicle or a natural obstruction in the blind spot. Through the configuration of detection ranges 26 and 30 shown in FIG. 2, such a decision is made possible in accordance with the present invention, even in a situation in which following vehicle 32 maintains a relatively long distance to vehicle 22.

Figure 3:
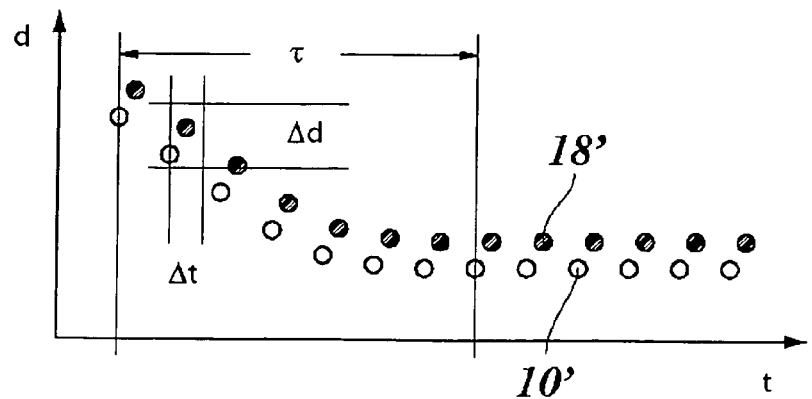
FIG. 3 is a distance/time diagram for explaining the mode of operation of the device shown in FIG. 1.

In FIG. 3, distances d periodically measured by main sensor 10 and auxiliary sensor 18 in consecutive measuring cycles are plotted against time t. Measuring points 10' in FIG. 3 represent the measurements of main sensor 10, and measuring points 18' represent the measurements of auxiliary sensor 18. The two sensors may operate at equal cycle time, but do not necessarily have to be synchronized, so that measuring points 10' and 18' may be offset in relation to one another on the time axis, as is shown in FIG. 3.

If the object detected by main sensor 10 is a following vehicle, at every measuring point 10' in a time interval which has an absolute value smaller than a predefined time interval Δt, there must be a measuring point 18' having a distance value which differs only slightly from that of measuring point 10', i.e., the distance differential must have an absolute value smaller than a specific value Δd. Comparison unit 16 thus checks for each measuring point 10' whether there is a measuring point 18' within time interval ±Δt around this point, whose distance value differs in absolute value from the distance value of measuring point 10' by less than Δd. In order to rule out accidental correspondences of the distance values, it is additionally required that the above-mentioned condition be fulfilled not only for a single measuring point pair, but rather for all measuring point pairs within a time interval having at least a specific length τ. Through suitable selection of the parameters Δt, Δd, and τ, a suitable criterion for recognizing a following vehicle may thus be established.

In the example shown in FIG. 3, Δt is somewhat greater than half of the measuring cycle time of the sensors. Even if the cycle times of the two sensors are not exactly equal, it is therefore ensured that there is at least one measuring point 18' for each measuring point 10' within time interval ±Δt if the object is also detected by auxiliary sensor 18. When comparison unit 16 has found a measuring point pair once for which the distances correspond up to Δd, it is checked continuously for the following measuring point pairs whether the correspondence continues to be fulfilled, and if this is the case for a number of measuring points corresponding to time interval τ (if necessary, isolated outliers may be left out), the detected object is qualified as following vehicle 32, and blocking element 20 is activated.

If necessary, it may additionally be checked whether the increases or decreases in the distance values measured by main sensor 10 and auxiliary sensor 18 (i.e., the relative velocities of the positioned objects) correspond within specific tolerance limits.

Sensors 10, 18 and the associated analysis electronics may be designed in such a way that the sensors are capable of detecting multiple objects simultaneously if these objects cause a sufficiently clear radar echo and their distances differ sufficiently from one another. For example, if main sensor 10 detects two objects simultaneously, two measuring points 10' having different distances are obtained in each measuring cycle. If the second object is also detected by auxiliary sensor 18, for example, if it originates from a roof structure of following vehicle 32, two sequences of measuring point pairs 10', 18' are thus obtained, and the above-mentioned conditions must be fulfilled for each of these sequences so that blocking element 20 is activated. In this way, the case in which, in the situation shown in FIG. 2, a passing vehicle approaches on left neighboring lane 28, which is then detected by main sensor 10 but not by auxiliary sensor 18, may also be managed, for example.

However, if the sensor system is configured in such a way that it outputs either no measured distance or only the smallest measured distance in each measuring cycle, such a passing vehicle may not be detected until it has passed following vehicle 32, so that its distance becomes less than that of following vehicle 32.

The checks may also be continued by comparison unit 16 when the detected object has been classified as a following vehicle after expiration of time interval τ. For example, if previous following vehicle 32 begins passing and veers off onto left neighboring lane 28, it will leave detection range 30 of auxiliary sensor 18, with the result that measuring points 18' are not registered. Simultaneously, the distances measured by main sensor 10 will decrease. In this case, blocking element 20 is deactivated again and a warning signal is output by output unit 14.

Blocking element 20 would also be deactivated if measuring points 18' are still present, but no longer fulfill the required distance relationship. This case may occur, for example, if another vehicle travels on the right neighboring lane 34, which is approximately at the same level as following vehicle 32 and has the same velocity. Auxiliary sensor 18 may then not make a distinction between following vehicle 32 and this vehicle on right neighboring lane 34. However, if following vehicle 32 begins to pass and reduces its distance to vehicle 22, the distance differential between measuring points 10' originating from following vehicle 32 and measuring points 18' originating from the vehicle in right neighboring lane 34 increases accordingly.

Figure 4:
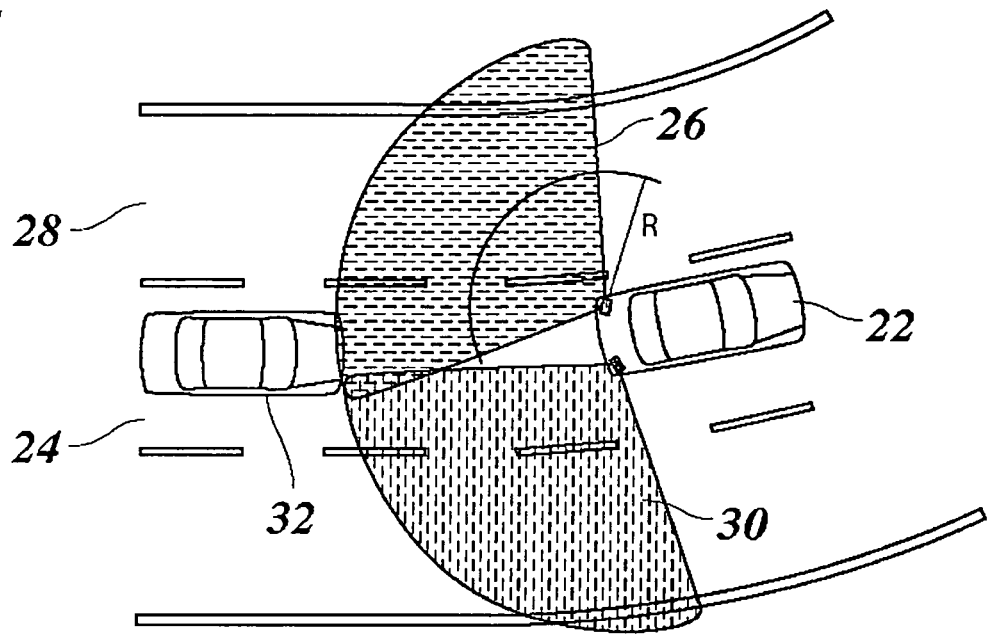
FIG. 4 shows a diagram illustrating another example traffic situation in connection with the operation of the device shown in FIG. 1.

FIG. 4 illustrates an example of a situation in which following vehicle 32 temporarily leaves detection range 30 of auxiliary sensor 18. This may occur, for example, if following vehicle 32 travels even further offset to the left to vehicle 22 or if, as in FIG. 4, vehicles 22, 32 enter a left curve, so that detection ranges 26, 30 are pivoted accordingly. In this case, however, in contrast to the situation described above, in which following vehicle 32 begins to pass, following vehicle 32 maintains its movement state essentially unchanged, i.e., the distances represented by measuring points 10' remain essentially unchanged or become gradually larger, if following vehicle 32 falls back slightly. In this situation, measuring points 10', which were assigned to following vehicle 32 on the basis of prior measurements, may still be identified with the following vehicle, and blocking element 20 remains active, so that an incorrect warning is suppressed.

However, in this situation as well, blocking element 20 is deactivated again and a warning signal is output if following vehicle 32 accelerates (the distances represented by measuring points 10' decrease) and/or if the distances measured by main sensor 10 fall below a specific minimum distance, which is symbolized in FIG. 4 by a circle having radius R. This minimum distance R is selected in such a way that it is less than the safety distance which would be maintained by a following vehicle 32 in any case, so that falling below this minimum distance indicates that the object is located on neighboring lane 28.

Figure 5:
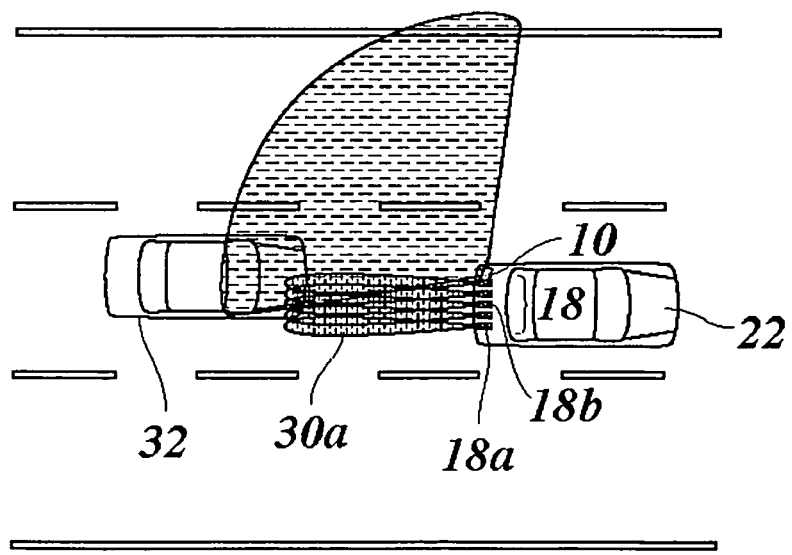
FIG. 5 shows a diagram illustrating an example traffic situation in connection with the operation of another example embodiment of a device according to the present invention.

FIG. 5 illustrates a modified exemplary embodiment in which the warning device of vehicle 22 only has main sensor 10 on the left vehicle side, while auxiliary sensor 18 is formed by a group of ultrasonic sensors 18a, 18b, which are simultaneously part of a parking aid for vehicle 22. Ultrasonic sensors 18a, 18b are installed in the rear bumper of vehicle 22, for example, and have detection ranges 30a directed to the rear. In this case, blocking element 20 is activated when following vehicle 32 is detected by at least one of ultrasonic sensors 18a, 18b, and the distance measured by this ultrasonic sensor or averaged over all ultrasonic sensors fulfills the criterion illustrated in FIG. 3. In this embodiment, auxiliary sensor 18 does not have to be continuously active, but rather it suffices to activate the ultrasonic sensors when a detection signal 10 is received by the main sensor.

Since ultrasonic sensors generally have a shorter range than an SRR radar sensor, it is expedient to bundle the ultrasonic signals transmitted by all ultrasonic sensors 18a, 18b, i.e., emit them synchronously, so that a greater signal strength and thus a greater detection are achieved. In this case, only one of the ultrasonic sensors has to be used to receive the reflected signal, for example, ultrasonic sensor 18*b* positioned in the middle of the vehicle. Since the installation position of ultrasonic sensors 18*a*, 18*b* generally differs from that of main sensor 10, the distance data measured by the ultrasonic sensors possibly has to be corrected before it may be processed by comparison unit 16.

In a cornering situation, as is illustrated in FIG. 4, a distance correction may also be provided in both example embodiments, which takes the tilting of vehicle 22 in relation to following vehicle 32 into consideration. This tilting may be derived from the roadway curvature and the measured distance, and the roadway curvature may in turn be determined on the basis of the steering angle, the signal of a yaw rate sensor, or the like.

What is claimed is:

1. A device for detecting an object in a blind spot on a side of a host vehicle, comprising:
   a main ranging sensor having a detection range that extends into rear area of the host vehicle and towards a selected vehicle side;
   an output unit for outputting a warning signal which indicates an object in a blind spot on the selected vehicle side;
   an auxiliary ranging sensor having a detection range that extends into rear area of the host vehicle and angularly offset with respect to the detection range of the main ranging sensor into the rear area of the vehicle; and
   a comparison unit for comparing detection signals generated by the main ranging sensor and the auxiliary ranging sensor, wherein the comparison unit ascertains based on predefined correlations between the detection signals whether a vehicle following the host vehicle is present, and wherein the comparison unit blocks the output unit from outputting a warning signal when it is determined that a vehicle following the host vehicle is present;
   wherein the comparison unit blocks the output unit from outputting a warning signal if, within a predefined time period including multiple measuring cycles of the main ranging sensor and the auxiliary ranging sensor, the following condition is satisfied:
      for each detected measuring point which represents a distance measured by the main ranging sensor at a selected time, a corresponding trailing measuring point is detected which represents a distance measured by the auxiliary ranging sensor within a time interval which is less than a predefined maximum time interval from the selected time, wherein the distance represented by the detected measuring point differs from the corresponding trailing measuring point by less than a predefined absolute value.

2. The device as recited in claim 1, wherein the main ranging sensor is a short-range radar sensor.

3. The device as recited in claim 2, wherein the auxiliary ranging sensor simultaneously functions as further main ranging sensor for detecting objects in a blind spot on a side of the vehicle opposite to the selected vehicle side.

4. The device as recited in claim 3, wherein the detection range of the main ranging sensor and the detection range of the auxiliary ranging sensor at least touch each other along the longitudinal central axis of the host vehicle.

5. The device as recited in claim 2, wherein the auxiliary ranging sensor is a component of another detection system of the host vehicle.

6. The device as recited in claim 5, wherein the another detection system is a parking-aid system, and wherein the auxiliary ranging sensor is formed by at least one ultrasonic sensor.

7. The device as recited in claim 5, wherein the auxiliary ranging sensor is formed by a plurality of ultrasonic sensors, and wherein the plurality of ultrasonic sensors are activated to synchronously emit ultrasonic pulses.

8. The device as recited in claim 1, wherein, subsequent to the determination that a vehicle following the host vehicle is present, the comparison unit blocks the output unit from outputting a warning signal even if the auxiliary ranging sensor no longer detects the vehicle following the host vehicle, for as long as at least one of a distance of a detected object measured by the main ranging sensor and a time derivative of the distance of the detected object is greater than a predefined limit value.

9. A device for detecting an object a blind spot on a side of a host vehicle, comprising:
   a main ranging sensor having a detection range that extends into a rear area of the host vehicle and towards a selected vehicle side;
   an output unit for outputting a warning signal which indicates an object in a blind spot on the selected vehicle side;
   an auxiliary ranging sensor having a detection range that extends into the rear area of the host vehicle and angularly offset with respect to the detection range of the main ranging sensor into the rear area of the vehicle; and
   a comparison unit for comparing detection signals generated by the main ranging sensor and the auxiliary ranging sensor;
   wherein the comparison unit:
      ascertains that a vehicle following the host vehicle is present when, within a predefined time period that includes multiple measuring cycles of the main ranging sensor and of the auxiliary ranging sensor, for each main detected measuring point that represents a distance measured by the main ranging sensor at a selected time, a corresponding auxiliary measuring point is detected (a) that represents a distance that does not differ from the distance represented by the main detected measuring point by more than a predefined absolute value and (b) that is measured by the auxiliary ranging sensor within a time interval that is less than a predefined maximum time interval from the selected time; and
      blocks the output unit from outputting a warning signal when it is determined that a vehicle following the host vehicle is present.

10. The device as recited in claim 9, wherein the main ranging sensor is a short-range radar sensor.

11. The device as recited in claim 10, wherein the auxiliary ranging sensor simultaneously functions as a further main ranging sensor for detecting objects in a blind spot on a side of the vehicle opposite to the selected vehicle side.

12. The device as recited in claim 11, wherein the detection range of the main ranging sensor and the detection range of the auxiliary ranging sensor at least touch each other along the longitudinal central axis of the host vehicle.

13. The device as recited in claim 10, wherein the auxiliary ranging sensor is a component of another detection system of the host vehicle.

14. The device as recited in claim 13, wherein the another detection system is a parking-aid system, and wherein the auxiliary ranging sensor is formed by at least one ultrasonic sensor.

15. The device as recited in claim 13, wherein the auxiliary ranging sensor is formed by a plurality of ultrasonic sensors, and wherein the plurality of ultrasonic sensors are activated to synchronously emit ultrasonic pulses.

16. The device as recited in claim 9, wherein, subsequent to the determination that a vehicle following the host vehicle is present, the comparison unit blocks the output unit from outputting a warning signal even if the auxiliary ranging sensor no longer detects the vehicle following the host vehicle, for as long as at least one of a distance of a detected object measured by the main ranging sensor and a time derivative of the distance of the detected object is greater than a predefined limit value.

17. A device for detecting an object a blind spot on a side of a host vehicle, comprising:
- a main ranging sensor having a detection range that extends into a rear area of the host vehicle and towards a selected vehicle side;
- an output unit for outputting a warning signal which indicates an object in a blind spot on the selected vehicle side;
- an auxiliary ranging sensor having a detection range that extends into the rear area of the host vehicle and angularly offset with respect to the detection range of the main ranging sensor into the rear area of the vehicle; and
- a comparison unit for comparing detection signals generated by the main ranging sensor and the auxiliary ranging sensor;
- wherein the comparison unit blocks the output unit from outputting a warning signal when a condition is satisfied that, within a predefined time period that includes multiple measuring cycles of the main ranging sensor and of the auxiliary ranging sensor, for each main detected measuring point that represents a distance measured by the main ranging sensor at a selected time, a corresponding auxiliary measuring point is detected (a) that represents a distance that does not differ from the distance represented by the main detected measuring point by more than a predefined absolute value and (b) that is measured by the auxiliary ranging sensor within a time interval that is less than a predefined maximum time interval from the selected time.

18. The device as recited in claim 17, wherein, subsequent to satisfaction of the condition, the comparison unit blocks the output unit from outputting a warning signal even if the condition is no longer satisfied, for as long as at least one of a distance of a detected object measured by the main ranging sensor and a time derivative of the distance of the detected object is greater than a predefined limit value.

19. The device as recited in claim 17, wherein the auxiliary ranging sensor simultaneously functions as a further main ranging sensor for detecting objects in a blind spot on a side of the vehicle opposite to the selected vehicle side.

20. The device as recited in claim 19, wherein the detection range of the main ranging sensor and the detection range of the auxiliary ranging sensor at least touch each other along the longitudinal central axis of the host vehicle.

* * * * *